2 Sheets--Sheet 1.

E. WHEELER.

Sleeping-Car.

No. 6,651.

Reissued Sept. 21, 1875.

Witnesses:

Geo. Mears

Lorenzo Hickok

Inventor:

Eli Wheeler per Saml. A. Duncan atty

2 Sheets--Sheet 2.

E. WHEELER.

Sleeping-Car.

No. 6,651.

Reissued Sept. 21, 1875.

Witnesses:

Geo. L. Seavers

Serenus Hickok

Inventor:

Eli Wheeler per Saml. A. Duncan atty

UNITED STATES PATENT OFFICE.

ELI WHEELER, OF ELMIRA, NEW YORK, ASSIGNOR, BY MESNE ASSIGNMENTS, TO GEORGE M. PULLMAN, OF CHICAGO, ILLINOIS.

IMPROVEMENT IN SLEEPING-CARS.

Specification forming part of Letters Patent No. 25,499, dated September 20, 1859; extended seven years; Reissue No. 6,651, dated September 21, 1875; application filed July 31, 1875.

*To all whom it may concern:*

Be it known that ELI WHEELER, of Elmira, in the county of Chemung and State of New York, was the original and first inventor of certain new and useful Improvements in Sleeping-Cars, for which Letters Patent of the United States No. 25,499 were issued to him September 20, 1859, for the term of fourteen years, the same subsequently having been extended for the further term of seven years, of which invention and the Letters Patent relating thereto I, GEORGE M. PULLMAN, have become, by mesne assignments, the sole and exclusive owner; and I hereby declare that the following is a full, clear, and exact description of the same, reference being had to the accompanying drawings, which form a part of this specification, in which—

Figure 1:
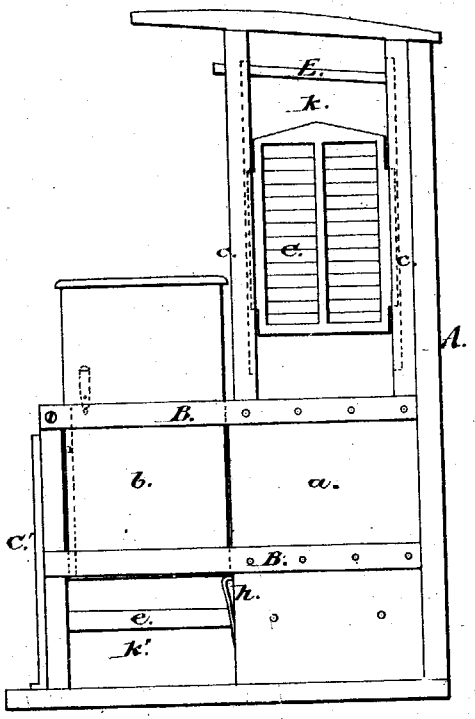
Figure 2:
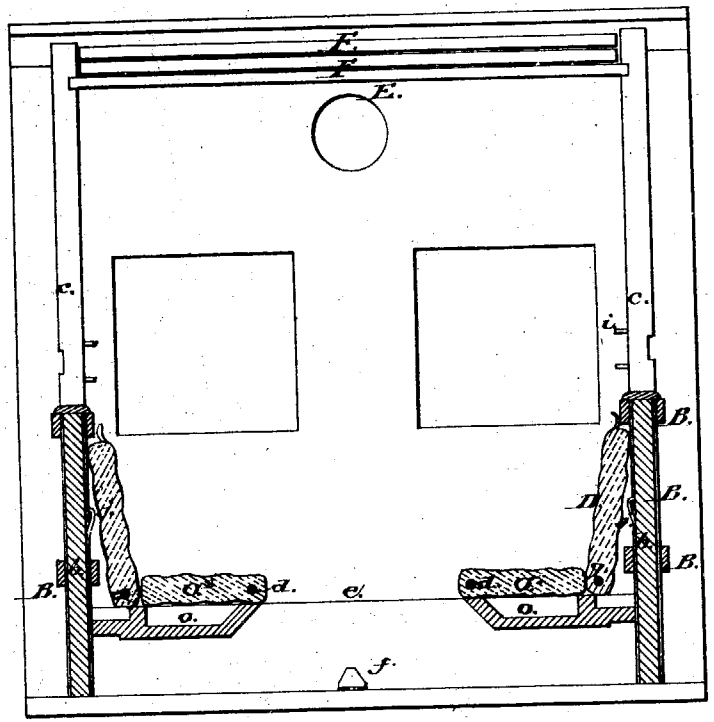
Figure 3:
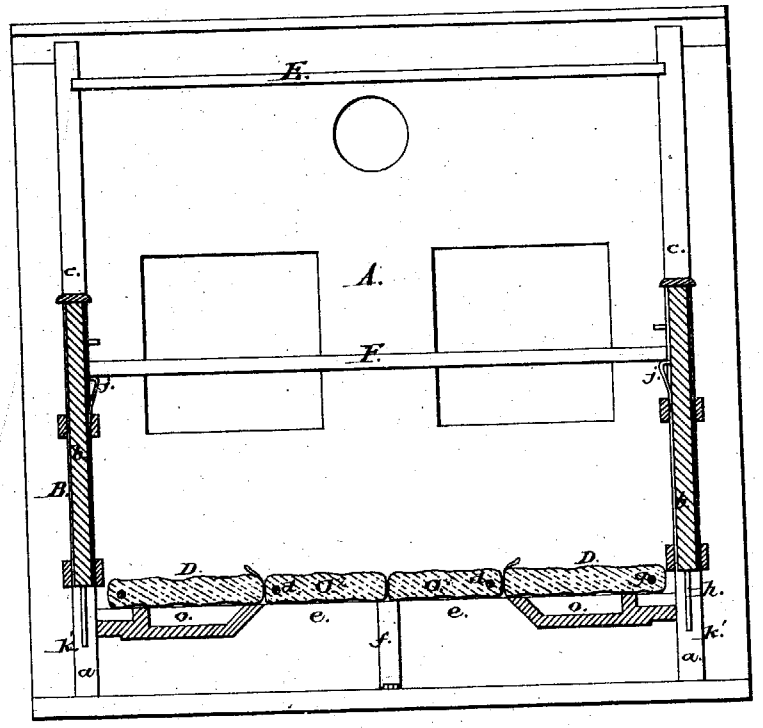

Figure 1 is an end view of a section or compartment of a sleeping-car having the improved devices applied thereto. Fig. 2 is a vertical longitudinal section through one of the compartments, showing the seats as used in the day-time. Fig. 3 is a similar section, but showing the parts as arranged for night use.

Prior to this invention sleeping-cars had been built which were divided up into compartments by permanent partitions. A serious disadvantage attending this mode of construction was that the partitions impeded the free circulation of air through the car in the day-time. Also, they obstructed the view through the car and seriously interfered with the easy movement of persons along the aisle. Other cars had been built in which there were no partitions, and consequently no compartments. This latter construction was objectionable, as not affording the necessary privacy for the occupants of the couches.

The present invention obviates both these defects of earlier constructions by providing the car with movable partitions, which, when placed in proper position at night, serve, in conjunction with the other parts with which they co-operate, to divide the car into compartments, whereby the requisite privacy will be attained, and which can be moved out of the way by day, so as to furnish a free circulation of air above the backs of the seats and around the heads and shoulders of the passengers, and give the passengers an unobstructed view through the car and permit them to move about with the same freedom as in an ordinary day-car.

Another feature of the invention relates to the mode of supporting the upper berths of the car when arranged for sleeping, and consists in utilizing for this purpose the movable parts of the partitions between the compartments.

The invention consists, further, in the employment, in connection with the upper berths of the car, of movable diaphragms or partitions, so constructed and arranged that, while serving as head and foot boards thereto, they will permit the circulation of air above the berths for ventilating the same, as hereinafter more fully set forth.

It also consists in a novel mode of constructing and arranging the back and bottom cushions of the seats, so that the day-seats may readily be converted into couches for night use, and vice versa.

In applying these improvements to an ordinary passenger-car the space on each side of the middle aisle is permanently divided into compartments by partitions placed about six feet apart and extending up substantially to the top of the seat-backs, so as to furnish a support for these latter when arranged for day use, and yet allow a perfect circulation of air around and above the heads of the passengers. As shown in the drawings, these partitions B B consist each of a frame-work supporting two panels or diaphragms, the outer one of which, *a*, being the part nearest the wall of the car, is made fast, while the part *b*, nearest the aisle, is made capable of sliding up and down in the framing of the partition. These inner and movable panels or diaphragms are provided with spring-brackets *j j*, for supporting the upper couches, and are themselves supported, when raised up to the desired distance, by springs or catches *h h*. From the top of the frame-work B, between adjoining compartments, two grooved uprights, *c c*, rise to the roof of the car, and between these uprights there is arranged a sliding blind or panel, C, the height of which is about one-half that of the uprights. This blind slides freely up and down in the grooves of the uprights, and when elevated to the top of the car it allows a circulation of air over and around the heads of passengers who may be sitting next to the wall of the car. When lowered so as to rest on the panel *a*, which is designed to be its position when the car is arranged for sleeping, it allows a circulation of air above the upper berths. It will thus be seen that, as illustrated in the drawings, part of the movable partition which aids in forming a compartment is moved upward out of the way by day and the other part downward. It should be stated, however, that the essence of this branch of the improvement consists in the employment of movable diaphragms or partitions in forming the compartments as contradistinguished from the use of permanent partitions for this purpose or the entire absence of partitions.

In order that each compartment may accommodate at night the same number of passengers that can be comfortably seated in it by day, the upper couch is made double, as well as the lower one. As represented in the drawings, the upper couch is composed of two portable mattresses, F F, which in the day-time may be stowed away upon a shelf, E, in the upper part of the car, but which at night are supported, the outer one upon the brackets *i i* and the inner one upon the spring-brackets *j j*, which are attached to the movable diaphragms *b*. These spring brackets or supports are attached to the movable diaphragms or partitions at such points that these parts, when the car is arranged for night use, will extend above the upper couches sufficiently to form head and foot boards to the inner half of such couches, the head and foot boards of the outer half thereof being formed by dropping the sliding panels C down to their lowest position. As shown in the drawings, moreover, the movable diaphragms *b* are of such a height that while serving, when adjusted for night use, as head and foot boards of the adjoining couches, yet they do not extend entirely up to the roof of the car. There is a special advantage in such a construction, inasmuch as it furnishes a ventilation for the upper couches, which generally occupy the least perfectly ventilated portion of the car.

The seats are arranged transversely of the car and facing each other in pairs. The bottoms O O are arranged over concave transverse suppoits or boxes *o o* in a manner to cover the same, and are pivoted at their forward edges to the seat-frame and to the side of the car, as shown at *d d*, the rear edges being left loose. By thus attaching the bottoms of the seats and making them of the proper width the space between each pair of seats can be filled up by simply turning the bottoms of the seats over toward each other, as shown in Fig. 3. The seat-bottoms, when thus turned over, are supported by a cleat, *e*, and by a hinged support or standard, *f*, which is raised up from the floor for that purpose. The boxes *o o*, formed beneath the seats, are for containing the bed-clothing and pillows, and these will be freely exposed to view, so as to be readily and conveniently removed when the seat-bottoms are turned over upon their pivots, as above described. The seat-backs D D are pivoted at their lower edges to the side of the car and to the seat-frame, as shown at *g g*, the upper edges being left loose. By thus attaching the seat-backs and making them of the proper width they may readily be dropped down into a horizontal position to take the place of the seat-bottoms when the latter have been inverted, and thus a level and comfortable lower couch be formed with facility and ease. The boxes beneath the seats, when the bed-clothing has been removed, are available for the reception of packages and valuables belonging to the occupants of the berth, furnishing a safe depository for the same by reason of the boxes being closed at night by the seat-backs, which are held down by the weight of the passengers.

What is claimed as new is—

1. Movable diaphragms or partitions which aid in dividing the car into compartments when the berths are arranged for sleeping, and which can be moved out of the way to afford ventilation and otherwise accommodate the passengers during the day, substantially as described.

2. Movable diaphragms or partitions which aid in supporting the upper berths and in dividing the car into compartments when the berths are arranged for sleeping, and which can be moved out of the way during the day to afford ventilation and otherwise accommodate the passengers, substantially as described.

3. In combination with the upper berths, movable diaphragms or partitions constructed and arranged to operate substantially as set forth, so that while forming the head and foot boards of such berths at night, with capacity of being moved out of the way by day, they will also permit the circulation of the air above the berths, as described.

4. In combination with the box-formed supports of the seats, the seat-bottoms and backs constructed and arranged to operate in the manner specified, so that when the bottoms of the seats are turned over to fill up the space between each pair of seats the bed-clothing in the box will be exposed, so as to be readily removed, and when the backs are turned down to fill the place occupied by the bottoms the boxes will thereby be closed up and a continuous bed formed from the one partition to the other, substantially as set forth.

GEO. M. PULLMAN.

Witnesses:
HORACE PORTER,
CHAS. W. ANGELL.